United States Patent
Bulitta et al.

(10) Patent No.: US 8,044,791 B2
(45) Date of Patent: Oct. 25, 2011

(54) CONTROL OF PLURALITY OF TARGET SYSTEMS

(75) Inventors: Clemens Bulitta, Spardorf (DE); Robert Kagermeier, Nuremberg (DE); Dietmar Sierk, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 12/283,489

(22) Filed: Sep. 11, 2008

(65) Prior Publication Data

US 2009/0076827 A1 Mar. 19, 2009

Related U.S. Application Data

(60) Provisional application No. 60/995,493, filed on Sep. 26, 2007.

(30) Foreign Application Priority Data

Sep. 19, 2007 (DE) .......................... 10 2007 044 792

(51) Int. Cl.
*G08B 23/00* (2006.01)
(52) U.S. Cl. ..................... 340/500; 340/531; 340/539.11
(58) Field of Classification Search ............... 340/539.1, 340/539.11, 539.13, 539.23, 539.32, 531, 340/500; 704/270, 275, E11.01, E11.04; 700/94; 702/182
See application file for complete search history.

(56) References Cited

U.S. PATENT DOCUMENTS

| | | | | |
|---|---|---|---|---|
| 6,993,486 B2 * | 1/2006 | Shimakawa | .................. | 704/275 |
| 7,062,339 B2 * | 6/2006 | Howard et al. | .................. | 700/94 |
| 7,254,516 B2 * | 8/2007 | Case et al. | .................... | 702/182 |
| 7,272,455 B2 * | 9/2007 | Tajika | ............................. | 700/65 |
| 7,649,456 B2 * | 1/2010 | Wakefield et al. | ........ | 340/539.13 |

FOREIGN PATENT DOCUMENTS

JP 2001014134 A * 1/2001

OTHER PUBLICATIONS http://www.heise.de/newsticker/result.xhtml?url=/newsticker/meldung/39730&word=, (Aug. 2003).

* cited by examiner

*Primary Examiner* — Van T. Trieu
(74) *Attorney, Agent, or Firm* — Lempia Summerfield Katz LLC

(57) ABSTRACT

A system for controlling or operating a plurality of target systems via spoken commands is provided. The system includes a first plurality of target systems, a second plurality of controllers for controlling or operating target systems via spoken commands, a speech recognition system that stores interface information that is specific to a target system or a group of target systems that are to be controlled or operated. A first controller in the second plurality of controllers includes a microphone for picking up audible signals in the vicinity of the first controller and a device for transmitting the audible signals to a speech recognition system. The speech recognition system is operable to analyze the interface information to recognize spoken commands issued for controlling or operating said target system.

14 Claims, 6 Drawing Sheets

CONTROL OF PLURALITY OF TARGET SYSTEMS

This patent document claims the benefit of German Patent Application DE 10 2007 044 792.4, filed Sep. 19, 2007, which is hereby incorporated by reference, and this patent document also claims the benefit of U.S. Provisional Application 60/995,493, filed on Sep. 26, 2007, which is also hereby incorporated by reference.

BACKGROUND

The present embodiments relate to control or operator control of a plurality of target systems, such as target processes or target units, via spoken commands. The control or operator control, which may be referred to as "controlling" or "operating," of individual target systems via spoken commands using automated speech recognition may be used in, for example, office automation or other technical fields. Target systems include text processing systems or other processor controlled machines, which respond to defined commands in a programmed manner. Target systems are controlled using speech recognition systems that use specific characteristics, which are tailored to the application and the target system to be controlled.

The specific characteristics make day-to-day dealings difficult for users wishing to use a plurality of target systems in a mixed sequence and having no opportunity to familiarize themselves with the specific characteristics of different target systems.

SUMMARY

The present embodiments may obviate one or more of the drawbacks or limitations inherent in the related art.

In one aspect, a system for controlling or operating a plurality of target systems, such as target processes or target devices, via spoken commands is provided. The system includes a first plurality of target systems and a second plurality of controllers for controlling or operating target systems via spoken commands. The second plurality of controllers includes a microphone for picking up audible signals in the vicinity of the controller, a device for transmitting said signals or signals derived therefrom to a speech recognition system, and a speech recognition system. The speech recognition system, which with respect to the target system currently controlled or operated, has interface information specific to the target system or to a group of target systems. The interface information is analyzed by the speech recognition system in order to recognize spoken commands issued for controlling or operating said target system.

In a second aspect, a controller for controlling or operating a plurality of target systems, such as target processes or target devices, via spoken commands is provided. The controller includes a microphone for picking up audible signals in the vicinity of the controller and a device for transmitting the audible signals or signals derived therefrom to a speech recognition system. The speech recognition system, with respect to a target system currently to be controlled or operated, has interface information specific to the target system or to a group of target systems. The information is analyzed by the speech recognition system in order to recognize spoken commands issued for controlling or operating said target system.

In a third aspect, a method for controlling or operating a plurality of target systems, such as target processes or target devices, via spoken commands is provided. The method includes assigning interface specific information to the target system or group; transmitting the interface information from a target system to a speech recognition system to check the target system into the speech recognition system, unless it is already stored on said speech recognition system; analyzing the interface information specific to the target system or the interface information specific to the group to which the target system belongs using the speech recognition system; and identifying spoken commands issued for controlling or operating the target system.

DETAILED DESCRIPTION

To control or operate a plurality of target systems (ZS1, . . . , ZSn), such as target processes or target devices, via spoken commands, there is assigned to each target system or groups of target systems interface information specific to that target system or that group. The interface information is transmitted from a target system to a speech recognition system (SES) to check (register) the target system into the speech recognition system, unless the interface information has already been stored on the speech recognition system (SES). To control or operate a target system, the speech recognition system analyzes the interface information (SI) specific to that target system or the interface information specific to the group to which the target system belongs in order to recognize spoken commands issued to control or operate the target system.

When a target system checks into (registers with) the speech recognition system (SES) or speech recognition systems (SES1, . . . , SESm), the speech recognition system(s) is/are automatically adapted to the characteristics of the target system to be operated or controlled. The check-in process can take place on a one-time basis, such as the first time a new target system is integrated into the system, each time a target system is restarted, or when the characteristics of a target system have been changed, such as when the operating software or hardware of a target system is updated.

The spoken commands may be detected via controllers that are not specific to one of the target systems, but may be individually assigned to individual system users. The controllers may be similar to voice recorders. The controllers (SG1, ..., SGm) have microphones (MP1, ..., MPm), which pick up the audible voice signals and convert the voice signals into electrical signals.

In the case of a central speech recognition system (SES), the interface information is then available to all the users, whereas, when using decentralized speech recognition systems (SE1, ..., SESm), for example, assigned to the individual controllers, only the interface information of those target systems already checked into its speech recognition system are available to a user.

Figure 1:
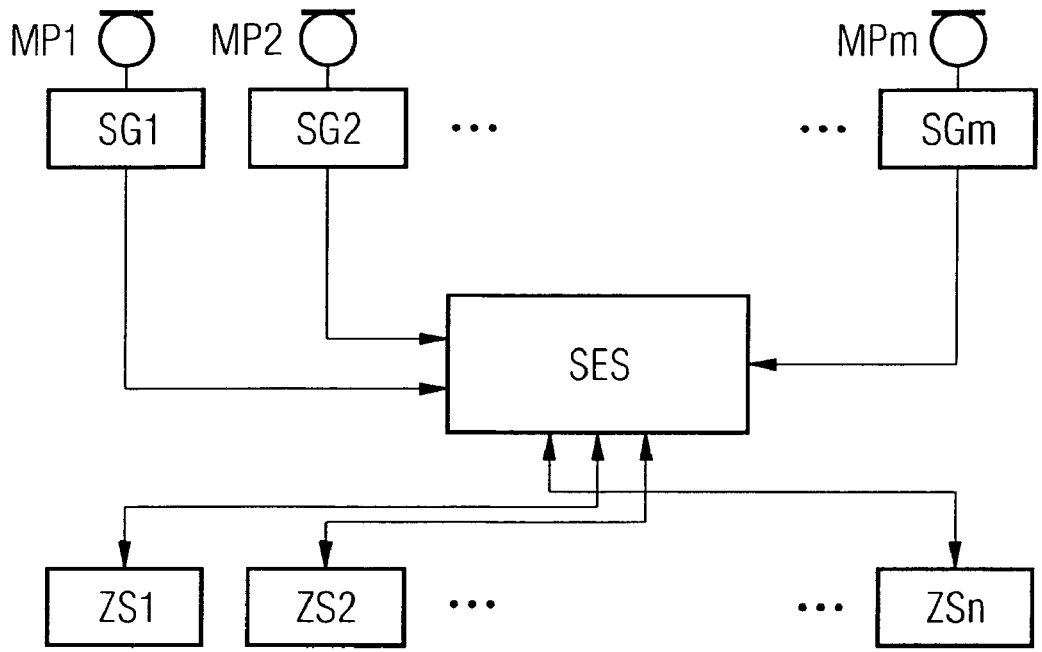
FIG. 1 illustrates one embodiment of a system for controlling or operating a plurality of target systems using a plurality of controllers and using a speech recognition system.

As shown in FIG. 1, when a central speech recognition system (SES) is used, the controllers (SG1, ..., SGm) forward these electrical voice signals to the speech recognition system (SES), which detects (e.g. in the voice signals) the commands spoken by the user for controlling or operating the target system to be controlled or operated.

The recognition includes assigning the associated target-system-specific control command data to the respective spoken command. The speech recognition system may know the vocabulary of the possible commands for a target system to be controlled or operated. The vocabulary of possible commands may be a component of the interface information (SI).

In order to facilitate the task-oriented assignment of a controller to a target system, which is currently being controlled by the controller, each portable controller may be identifiable using a unique unit ID (UID).

Using a unique unit ID (UID), the target system to be controlled or operated may recognize a controller via which it is currently being controlled or operated from that unit's UID.

A controller may assume the control or operation of a target system to be controlled or operated by virtue of the controller's proximity to the target system. This can be achieved, for example, by the use of short-range wireless transmission technologies, such as infrared or Bluetooth, if the range is selected such that there is only radio contact between a controller and a target system. Another possibility is to use radio frequency identification (RFID) chips (tags) in the controllers. The RFID chips employ a radio technology of suitable range.

The current position of a controller may determined and used for appropriate assignment of a controller to a target system to be controlled or operated by the controller. The position of the controller can be determined, for example, by delay measurements, triangulation, measuring the intensities of various transmitters of known position, or by using RFID chips in the controllers that can be accommodated, for example, by readers in the door consoles of the rooms.

In one embodiment, a controller (SG) for controlling or operating a plurality of target systems, such as target processes or target devices, via spoken commands is provided. The controller (SG) includes a microphone (MP) for picking up audible signals in the vicinity of the controller and a device (TD) for transmitting the signals or signals derived therefrom to a speech recognition system (SES). The speech recognition system (SES) has, with respect to a target system currently to be controlled or operated, interface information (SI) specific to the target system or to a group of target systems. The interface information (SI) is analyzed by the speech recognition system (SES) to detect spoken commands issued for controlling or operating the target system.

Figure 5:
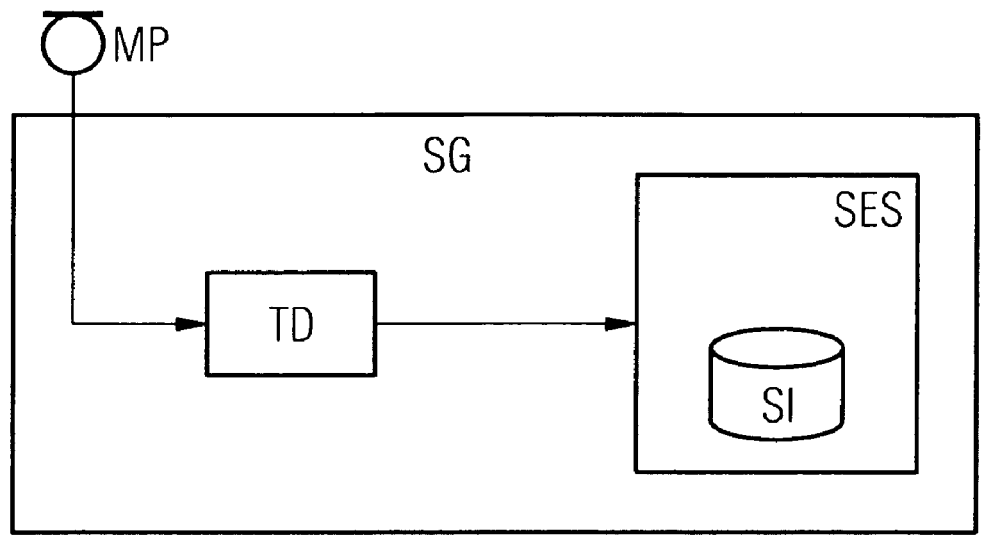
FIG. 5 illustrates one embodiment of the transmission, using a transmission device, of a voice signal picked up by a controller via a microphone to a speech recognition system incorporated in the controller.
Figure 6:
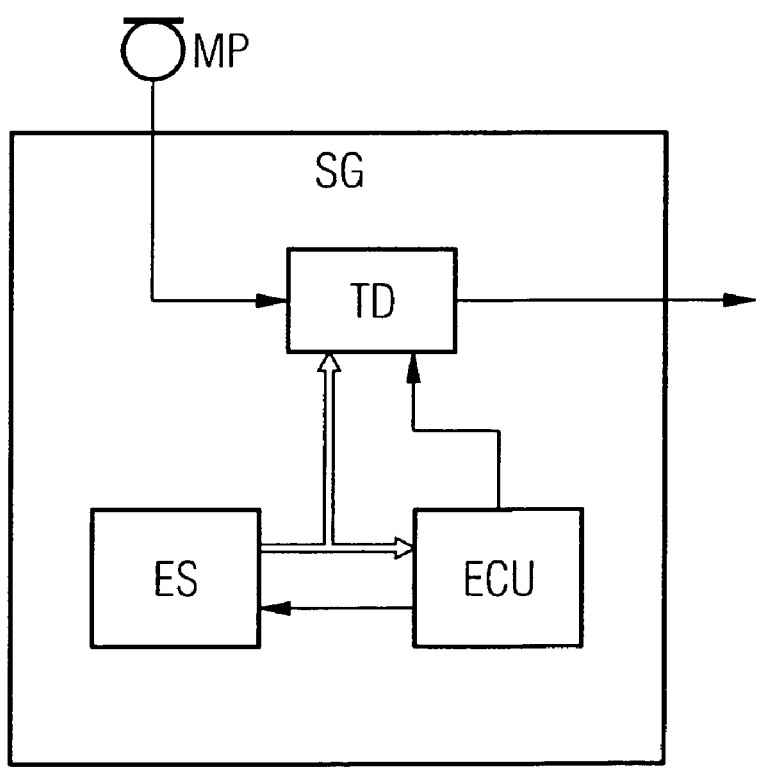
FIG. 6 illustrates one embodiment of a controller with an integrated energy store and an integrated device for controlling the power consumption of functional elements of the controller.

The speech recognition system (SES) may be incorporated in the controller, as shown in FIG. 5. The speech recognition system (SES) may be accommodated (disposed or performed), either wholly or partly, outside the controller (FIG. 3), for example, when the algorithms used for speech recognition become more complex and/or more memory space is required for executing the algorithms or for storing application-specific vocabularies. The respective state of semiconductor technology, speech recognition algorithms, radio transmission, speech encoding algorithms and similar technical fields may be used when deciding whether the speech recognition system (SES), or which of its sections, are to be accommodated in the controller.

Figure 2:
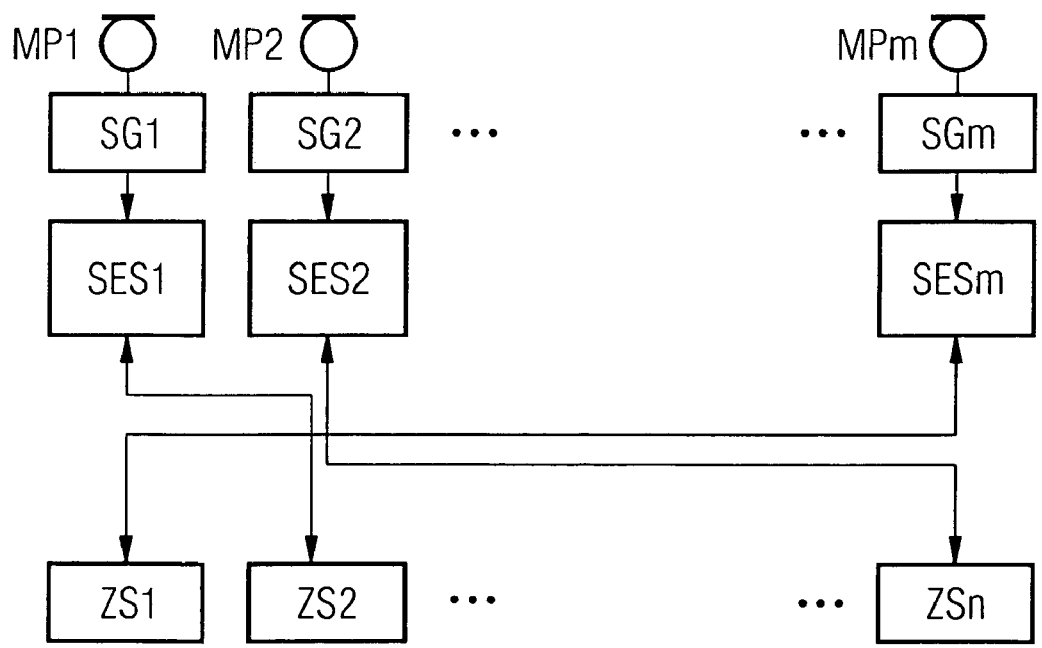
FIG. 2 illustrates one embodiment of a system for controlling or operating a plurality of target systems using a plurality of controllers having assigned speech recognition systems.

FIG. 2 shows a system in which each controller (SG1, ..., SGm) has a dedicated speech recognition system (SES1, ..., SESm), which may be incorporated in the respective controller. In this embodiment, each individual speech recognition system (SESj) requires only the interface information (SIj) specific to the target system (ZSj) currently to be controlled in order to be able to perform its recognition function. As shown in FIG. 1, a single central speech recognition system has to perform the speech recognition function simultaneously for a plurality of controllers (SG1, ..., SGm). The specific interface information (SI) is available in the speech recognition system (SES) at a particular point in time for all the target systems (ZS) which are to be controlled or operated at that point in time by at least one of the controllers.

Figure 3:
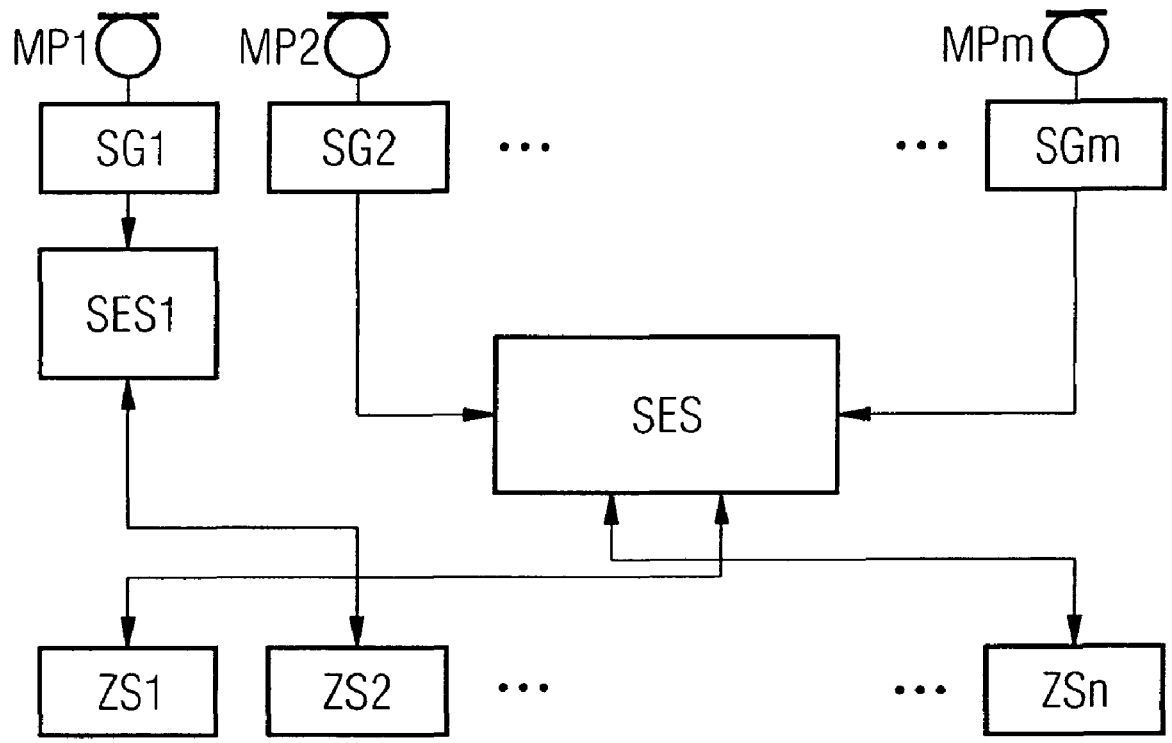
FIG. 3 illustrates one embodiment of a system for controlling or operating a plurality of target systems using a plurality of controllers having a mixed assignment of dedicated and shared speech recognition systems.
Figure 4:
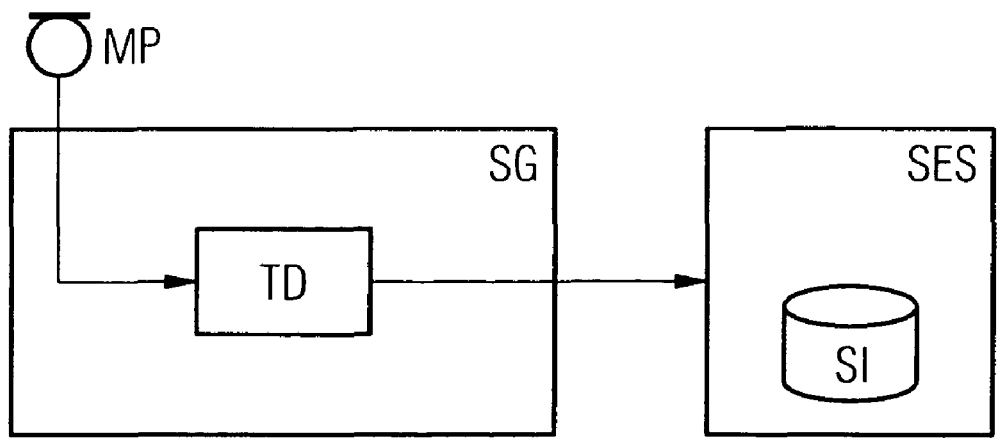
FIG. 4 illustrates one embodiment of the transmission, using a transmission device, of a voice signal picked up by a controller via a microphone to a speech recognition system.

FIG. 3 shows a mixed configuration. For example, one controller (SG1) has a dedicated speech recognition system (SES1), while the other controllers have to share the recognition capacity of a central speech recognition system (SES). The preferred solution for a particular application will be decided by the person skilled in the art on the basis of the application-specific requirements for speech recognition capacity or of the application-specific circumstances in terms of available radio channels or similar criteria.

In one embodiment, the controller (SG1 ... SGm) includes a local energy store (ES or Acc), a wireless communications interface (LPF, BTM) and a device (ECU) for minimizing the power consumption of the functional elements of the controller (SG1 ... SGm).

Figure 7:
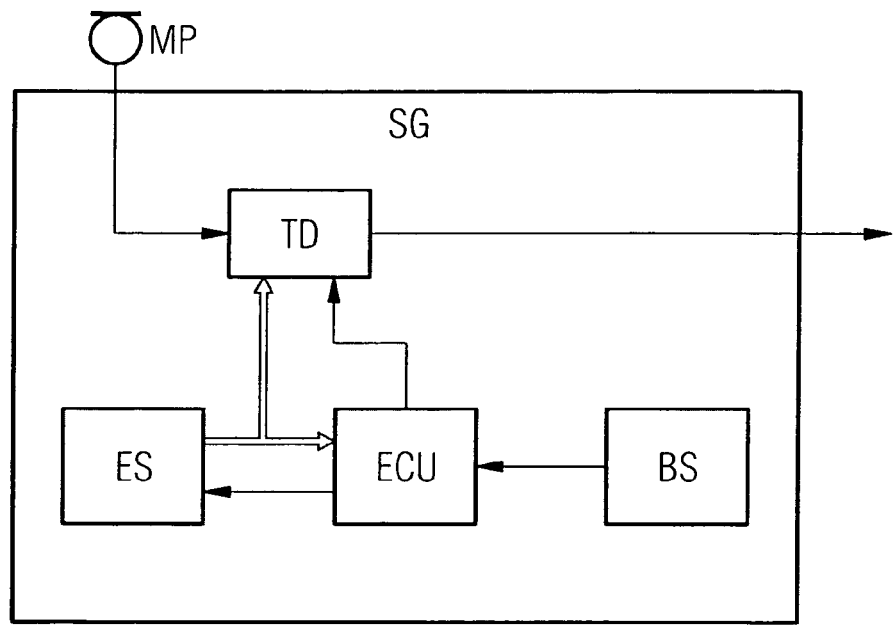
FIG. 7 illustrates one embodiment of a controller having an integrated device for controlling the power consumption of functional elements of the controller and an integrated accelerometer system.

The controller (SG1 ... SGm) may include an accelerometer system (BS), such as for gesture recognition or influencing the device (ECU) for minimizing power consumption. As also shown in FIG. 7, the accelerometer system (BS) may operate in conjunction with the device (ECU) for minimizing power consumption in order to control power consumption according to the situation.

Figure 8:
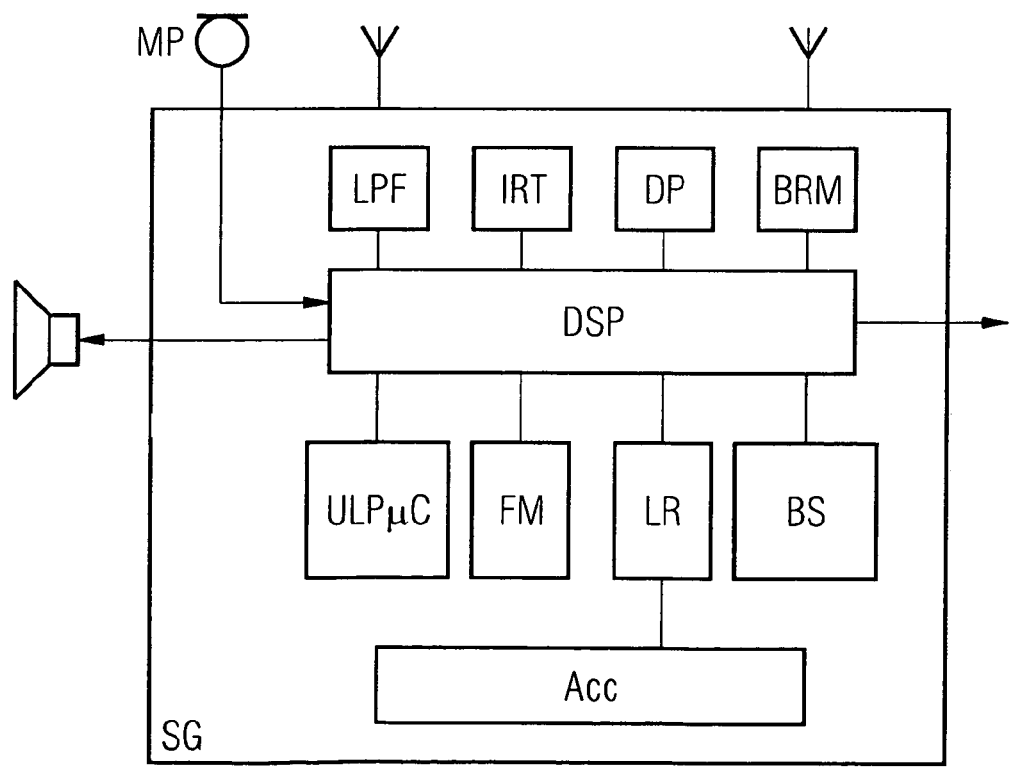
FIG. 8 illustrates one embodiment of a controller for controlling or operating a plurality of target systems.

FIG. 8 shows one embodiment of the controller (SG). The controller (SG) includes an integrated energy store (Acc), an integrated accelerometer system (BS), an integrated charge regulator (LR), a flash memory (FM), an ultra low power microcontroller (ULPμC), a digital signal processor (DSP) with control and speech recognition software, a low power radio chip (LPF), an infrared transceiver (IRT), a display (DP), and a Bluetooth module (BTM). The radio modules (LPF) or (BTM) and the infrared transceiver (IRT) enable the controller (SG) to communicate wirelessly with other components of the system, such as an external speech recognition device (SES) or directly with the target systems to be controlled. The speech signals are picked up via the microphone (MP). Controller messages are displayed to the user via the display (DP).

The digital signal processor DSP may be used to carry out speech recognition, or in the case of external speech recognition to encode of the voice signals into audio data that can be transmitted in this form over one of the radio interfaces to the speech recognition system (SES). The overall system is may be controlled by a power saving microcontroller (ULPµC).

In one embodiment, a system for controlling or operating a plurality of target systems, such as target processes or target devices, via spoken commands is provided. The system may include a first plurality of target systems and a second plurality of controllers for controlling or operating target systems via spoken commands. The controllers may include a microphone for picking up audible signals in the vicinity of the controller and with a device for transmitting the signals or signals derived therefrom to a speech recognition system.

The system may include a speech recognition system which, in respect of a target system currently to be controlled or operated, has interface information specific to the target system or to a group of target systems. The interface information is analyzed by the speech recognition system in order to recognize spoken commands issued for controlling or operating said target system.

Various embodiments may be used to enable voice-aided control of operating functions in the home, production or automation environment, or in the automotive field.

In one application, as the costs of building automation systems are constantly falling, such systems are being increasingly used not only in industrial and office buildings, but also in the private sector. It is necessary to offer the user/resident a convenient user interface in order to enable the corresponding functions such as light, heating, air conditioning, or home entertainment to be controlled.

A plethora of devices, such as in the home entertainment field, necessitates a large number of remote controls. A programmable remote control unit tends to result in a keypad overloaded with operating functions or in switching between menus. In addition, because of its size, the user does not have the remote control constantly with him and cannot initiate the desired function from any location at any time.

A corresponding remote control system includes a number of controls which are actuated by the user when required. The operating functions selected are forwarded via infrared or radio to a central or peripheral control unit which in turn initiates the desired system response.

In one embodiment, a wearable, small-format, battery-powered controller, which includes a speech recognition unit, various communications interfaces and a minimal user interface, such as an LCD or OLED display, and a push-to-talk button ("PTT button"). The term "push-to-talk" refers to the button used in radio equipment for activating the transmitter or switching from receive to transmit or similar. The controller may be implemented, for example, in the form of a wristwatch or as an amulet-like device attached to a lanyard, or a headset.

The remote control unit is activated from the power-saving dormant state by pressing the button (push-to-talk), the user then having about 10 . . . 15 seconds to verbally issue an appropriate control command, such as "light on", "roller blind up", "play CD". The recognized command is then transmitted to the home automation system either by infrared signal or via a radio interface. The system may be a meshed network system. The network nodes may be accessible for the mobile unit. By appropriate routing of the radio command, the "addressed" node such as light or roller blind control or home entertainment system receives the desired operator command.

For simple integration of devices hitherto controlled via infrared, such as in home entertainment, radio or infrared gateways are incorporated into the meshed network. The gateway is placed close to the infrared receiver of the home entertainment device, thereby enabling these devices to be controlled. Wired or wireless, battery-powered gateways are possible.

In one embodiment, the mobile remote control unit includes a Bluetooth-based handsfree facility. The user, with appropriate configuration and proximity of his mobile communication device, may control telephony functions via the wristband-based controller.

A handsfree unit may be detached from the wristband and attached directly to the user's auditory input by appropriate hinged clips. The user may hold confidential conversations. Due to integrated speech recognition, language selection or operation are of course also possible.

By analyzing field strength and signal delay paths, the home automation system may identify the room in which the user is located. From this are deduced, for example, non-addressed, general commands, such as "light brighter" or "music louder," which are assigned to the room in which the user is located. If, for example, the home entertainment system includes a powerful multimedia PC, simple operating functions may be analyzed on the mobile speech recognizer before being sent to the PC for execution (e.g., loud, quiet, next title), thereby additionally enabling the power saving push-to-talk (PTT) mode of the mobile unit to be maintained. If the user wishes to perform complex control functions, such as using a search engine or surfing the Internet, the mobile speech recognizer platform would not have the required computing power or the required memory. Either simple voice transmission (headset profile) or even high-quality audio transmission (A2DP profile) can be established to the PC under voice control, for example, via the integrated Bluetooth radio connection. Via this direct voice connection, a high-quality PC-based speech recognizer or if required a voice recorder can be addressed and complex operation of the multimedia system takes place. Continuous radio transmission may result in a higher current drain here.

If the PTT button is implemented as 4-18-way joystick, a cursor function can be implemented via the Bluetooth HID profile (Human Interface Device profile).

In another application, a controller may be used in a motor vehicle. The controller may be a handsfree set, which "roams" with the user irrespective of the vehicle. Vehicle operation (e.g., light, air-con) and in-car entertainment features can be controlled therewith if appropriate radio gateways are available in the vehicle. A "keyless entry" function may be possible (e.g. when the user approaches the vehicle, a radio connection is set up between mobile unit and vehicle and the latter is directly unlocked on pressing the PTT button).

The mobile unit may include an RFID tag. The home automation system may include an RFID tag with RFID readers, for example, in the doorways. For example, the room light may be switched on automatically as soon as the user enters the room. Through detection of the RFID tag, another criterion for the abovementioned radio-based "location awareness" would be provided (increased awareness of the location in the building). Access controls may be implemented with the RFID tag. Accordingly, door opener functions may be implemented both via the integrated RFID and by voice command.

The mobile unit is battery powered. A simple charger/docking station enables the battery to be recharged either via electrical contacts or inductively. It would optionally be possible to use a high-value UltraCap capacitor which could be charged within seconds.

Power-save mode using the PTT function allows several days' use without recharging (comparable to a cellphone) in the current state of technology and wristwatch format.

The energy store may be implemented as a lithium polymer foil battery in the form of a wristband, in order to allow a smaller design of the watch case and/or a longer operating time.

The mobile unit can include a power saving LCD or OLED display which provides the user with a time indication (watch function) in the dormant state. In PTT mode it displays the recognized command and indicates whether the desired function has been successfully executed (acknowledgement via radio from the actuator network node).

The display may be used to display SMS messages which could be transmitted via Bluetooth from the cellphone to the mobile unit.

The vocabulary can be defined as required via a PC-based configuration tool and transmitted contactlessly by the integrated Bluetooth interface.

The speech recognition based remote controller includes a "one button control" for operating functions in the home or vehicle. For example, the "one button control" may be used for intuitive operation at all times from any location inside the home and in the motor vehicle; vocabulary flexibly definable and downloadable; any assignment of the voice commands to the respective target HW/actuator by PC-based configuration tool; very low power consumption, as activation is via PTT; minimized power consumption in the active state through use of low power radio technologies; high connectivity through use of standardized radio interfaces (8681915 MHz, Bluetooth, Z-Wave, ZigBee, etc.). The "one button control" is inexpensive, as speech recognition can be incorporated in the integrated DSP of the Bluetooth chip (e.g. CSR chipset BC05); is simple, intuitive "one-button operation" for a large number of controllable operating functions; has a high recognition rate and very low misrecognition rate through PTT activation of the speech recognizer; has a high recognition rate due to short acoustic transmission path (approx. 10.30 cm); has a low technical complexity compared to fixed microphone array solutions for voice control in the home environment;—by combining widely used Bluetooth radio technology with ultra low power radio technology, convenience functions such as handsfree are available as well as power saving mode in the home automation system;—can be used both at home and in motor vehicles; and may be applied in production shops and office buildings.

Figure 9:
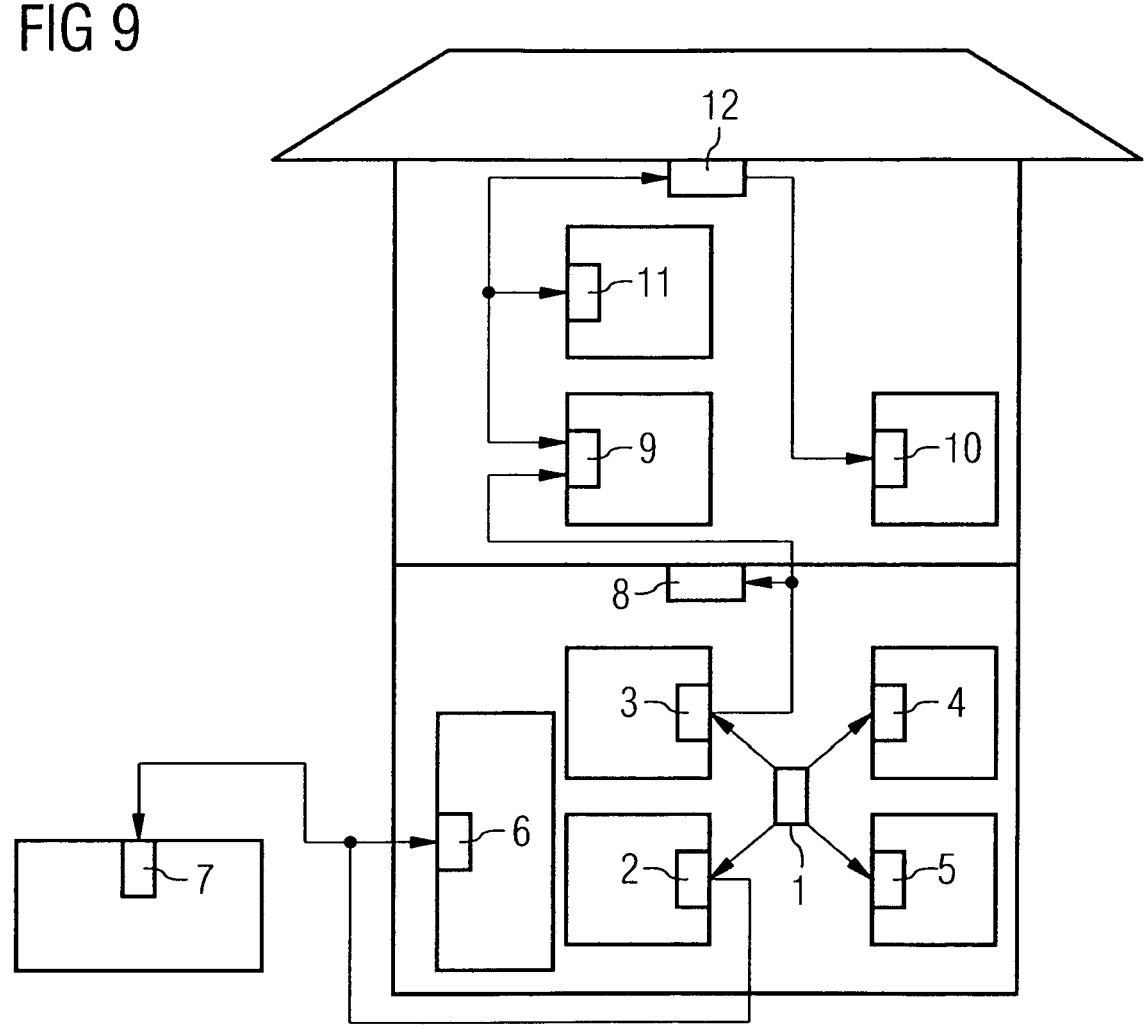
FIG. 9 illustrates a one embodiment of a network structure for setting up a low power radio frequency (RF) meshed network in a building.

FIG. 9 illustrates a meshed network with low power transmitters (low power RF) that is used to control an entire building including motor vehicle with a personal mobile controller (1).

For this purpose there is typically a Bluetooth connection to the personal computer (4) and to the telephone, and possibly other radio connections or an IR connection to the heating (2), to the roller blind control (3), and to the entertainment electronics (5). The transceiver on the heating system could be used as a relay or repeater to the door (6) whose transceiver could in turn establish the connection to the vehicle (7).

If, for example, the transceiver on the roller blind control (3) is implemented as a bridge to the room lighting (8), the connection to devices in the upper floor, such as heating (9), roller blind control (11), lighting (12) and kitchen units (10), could be established from here.

If the wearer of the controller now issues verbal commands such as "open front door" or "light on", these voice signals would be interpreted as commands to the nearest devices to which these commands are addressed according to their content, for example, to the front door, which may not to the nearest door, and to the nearest lighting in the house. If the user verbally issues commands such as "radio on", "louder", "next title" or "play CD", these commands will be executed by the nearest device of the in-house entertainment electronics that can reasonably carry out the command. If the user does not want this, he can unambiguously assign the commands to a device by adding the equipment name or location, such as "car radio" or "living room".

A system may incorporate activation of a speech recognizer by gesture analysis by accelerometers.

For voice control, only the defined voice commands are recognized, such that any other speech flow in the vicinity of a voice control system does not result in misrecognitions. Accordingly, the push-to-talk button may be used for selective brief activation of the voice recognizer. The speech recognition system then analyzes only the signal sequence of the subsequent 10 . . . 15 seconds, which may achieve a high recognition rate.

In order to avoid the manual interaction on the part of the user, a speech recognition system can operate in a continuous recognition mode. By suitably ingenious, usually very complex algorithms it is possible to extract the wanted voice commands from the flow of words and minimize misrecognitions. During this process, the speech recognition system will analyze the flow of words continuously or often with high or even full computing capacity and consequently have a correspondingly high power consumption.

In one embodiment, a wearable, small, battery-powered speech recognition system, for example, a wristwatch, is used as the controller. The system may include wireless communications interfaces (such as 868 MHz, Bluetooth, infrared) and a user interface, such as an LCD or OLED display and a PTT button ("push-to-talk" button). The controller is additionally equipped with a 3- or optionally 6-axis accelerometer system in power-saving MEMS design and with a power-saving processor.

The PTT button may be used activate a power-saving dormant state, recognize appropriate voice commands, and forward the corresponding system reactions across the communications interfaces present.

Alternatively, however, a gesture recognition mode can also be selected in which the raising of an arm in front of the speaker's face is analyzed. This typical arm movement and position (checking time on wristwatch) can be detected by appropriate processing algorithms and recognized as the intention to subsequently issue a voice command.

The speech recognition and communication section of the unit is activated by the gesture recognizer for 10 . . . 15 seconds. In order to increase gesture recognition reliability, another brief, rapid rotation of the wrist can be provided as another recognition feature (shake-to-talk instead of push-to-talk).

The gesture processing unit and accelerometer system is preferably realized in ultra low power technology (power consumption 500 fA). The part of the unit which has a high power consumption, namely the speech recognition section (DSP), is only activated for the brief time, such as 10 . . . 15 seconds, thereby enabling a relatively long operating time of the voice control system to be achieved.

In one embodiment, manual PTT actuation is replaced by gesture recognition. Fewer user interactions are necessary. A gesture is performed before a voice command is issued. Power consumption can be very low, as gesture processing can be implemented in ultra low power technology. A high recognition rate and very low misrecognition rate through PTT-comparable activation of the speech recognizer is possible. One-hand operation is possible.

In one embodiment a controller may be used for voice-aided control of medical diagnostic or therapy systems.

In hospitals or larger radiology units, different diagnostic and/or therapy systems of a manufacturer are usually represented, such as conventional x-ray workstations, computed tomography systems, MR (magnetic resonance) machines, various ultrasound machines. In proprietary systems, standardization of the operating concepts has been implemented (SYNGO), which has to some extent been limited to the graphical user interface. It has enabled the user to quickly become familiar with the operation of the particular machine.

Voice control of the equipment is one man-machine interface. Voice control on medical equipment is one solution for operation of the medical equipment. Standardization of the operating concept has been largely absent. There is no uniform voice control concept across all modalities.

In one embodiment, a wearable, small, battery-powered controller incorporates a speech recognition unit, various communications interfaces and a minimized user interface (e.g. including a LCD or OLED display and a PTT button). The controller can be implemented, for example, in the form of a wristwatch or as an amulet attached to a lanyard, or also as a headset (in some circumstances even as a commercially available personal digital assistant (PDA)).

The remote control unit is activated from the power-saving dormant state by pressing a button (e.g., push-to-talk button), whereupon the user then has approximately 10 . . . 15 seconds to issue an appropriate voice command such as "previous image", "imaging program I", or "zoom in". The recognized command is then transmitted to the medical equipment either by infrared signal or via a radio interface.

Instead of pressing a PTT button, gesture recognition by an integrated accelerometer system can also be used to activate speech recognition. In general, previously described exemplary embodiments may be combined with the features described below, depending on the particular application situation. The three examples described below provide more suggestions for such combinations or variants, the complete description of which is precluded here for reasons of space.

The portable unit (controller) can, for example, also be easily detached from the wristband or neckband and inserted in a special mount provided with charging contacts which is held up to the unit. By voice command or by pressing a button, the unit can be switched to continuous recognition mode in order to enable free, gesture-independent speech recognition (e.g. for interventional work on the patient).

The voice control unit is identifiable by a unique ID (UID). The individual modalities are programmed onto said UID at initial setup in a service mode known as "check-in". This can be performed by locating each individual item of equipment and bilaterally checking-in the voice control unit with the respective equipment. A manufacturer's equipment may disseminate this "check-in information" automatically via the hospital network usually present. For example, check-in may be performed on one item of equipment and is communicated from the equipment to the other modalities via the network.

The check-in process is only carried out once at initial setup of the voice control and then remains stored as the configuration in the respective systems. During the check-in, the UIDs of the respective items of equipment (e.g. MR-012345, CT-098765, . . . , etc.) and the associated recognizer vocabulary may be transmitted to the voice control unit.

When configuration is complete, the user can move from one item of equipment to the next and, provided a permission or a free channel for connection setup to the equipment is provided, can selectively connect to the equipment automatically or by voice or keyed command, the vocabulary available on the equipment may be automatically selected in the speech recognition unit via the respective UIDs.

Due to the low transmit power of the mobile unit, there is no overreach that would reduce operating safety (max. range approx. 5.8 m radius around the equipment). The operator control functions may be limited to non-safety-relevant functions.

The modality, such as the target system, has a corresponding receive unit for this communication. The receive unit may include a gateway to the hospital's automation system.

The gateway may be used to control possible room functions, such as light, roller blind, ventilation, by voice (user-programmable as required).

Gateway modules may be used to incorporate operating functions of other manufacturers' equipment. A programmable infrared gateway may be used to link in other equipment already having an infrared remote control. Wired, as well as wireless, battery-powered gateways may be used.

If the user wishes to perform more complex system functions such as report dictation, image captioning with medical terms, or similar functions, the mobile speech recognizer platform might not have the necessary computing power or memory. Either a simple voice transmission (headset profile) or even a high-quality audio transmission (A2DP profile) to a workstation may be set up under voice control, for example, via an additional, integrated Bluetooth radio transmission.

Via this direct voice connection, a high-quality PC-based speech recognizer or possibly a voice recorder may be addressed, allowing complex operation of the medical equipment. Continuous radio transmission may result in higher current drain.

If the PTT button is implemented as a 4-18-way joystick, a cursor function may be implemented via the Bluetooth HID profile.

The mobile remote control unit may include a Bluetooth-based handsfree facility. With appropriate configuration and proximity of his mobile communication device, this enables the user also to handle telephony functions via the wristband-based controller.

The handsfree set may be detached from the wristband and attached directly to the user's auditory input by appropriate hinged clips. The user may hold confidential conversations. Due to integrated speech recognition, language selection or operation are also possible.

As an alternative to automatic connection setup when approaching an item of medical equipment, it would also be conceivable for the mobile speech recognition system to include an RFID chip. This means that the mobile unit is only checked into the medical equipment when the user brings the RFID chip close enough to a reader.

The mobile unit may be battery-powered. Accordingly, a simple charger or docking station is provided which enables the battery to be recharged either via electrical contacts or inductively. It would optionally be possible to use a high-value UltraCap capacitor which could be charged within seconds.

Power-save mode with the PTT or gesture function allows several days' use without recharging (comparable to a cellphone) in the current state of technology and wristwatch format. The energy store may be implemented as a lithium polymer foil battery in the form of a wristband, in order to allow a smaller design of the watch case or a longer operating time.

The mobile unit may include a power saving LCD or OLED display which provides the user with a time indication (watch function) in the dormant state. In PTT mode it displays the recognized command and indicates whether the desired function has been successfully executed (i.e. acknowledgement received via radio).

It may be optionally used to display SMS messages which could be transmitted via Bluetooth from the cellphone to the mobile unit.

The speech recognizer based remote controller may be a simple, universal, cross-modality "one button control" for a wide range of different medical diagnostic and/or therapy systems.

The multimode voice control ensures short familiarization times and increases workflow efficiency. "Bilateral check-in" is possible as a "network-based check-in". "Network-based check-in" considerably reduces initial setup times. Automatic vocabulary switching according to the item of medical equipment facilitates operation. A high recognition rate may be achieved by switchable vocabularies (only limited vocabulary for each item of equipment), it being possible for such a vocabulary to be flexibly definable and e.g. downloadable from a server.

An integrated gateway to the building automation system reducing wiring complexity and offers convenient control of room functions.

Depending on the variant selected, the controller may provide a high degree of operating convenience (intuitive operation) for a large number of functions; very low power consumption, particularly in the case of activation by PTT button or gesture recognition; minimized power consumption in the active state through use of low-power radio technologies; an inexpensive solution, such as speech recognition may in some circumstances also be incorporated in the integrated DSP of the Bluetooth chip (e.g. CSR chipset BC05); simple, intuitive "one-button control" for a large number of controllable operating functions; a high recognition rate and very low misrecognition rate through PTT activation of the speech recognizer and a high recognition rate due to the short acoustic transmission path (approx. 10 . . . 30 cm); low technical complexity compared to fixed microphone array voice control approaches.

The combination of the widely used Bluetooth radio system with ultra low-power radio technology allows convenience functions, such as handsfree, and power-saving operations.

Speech recognition may be extended as required by a Bluetooth voice channel, such as a handsfree set, a voice recorder, or similar applications. Infrared gateways and other specific gateways offer flexible enhancements.

Through suitable standardization of the interface(s), the solution described can also be used for third-party suppliers.

Figure 10:
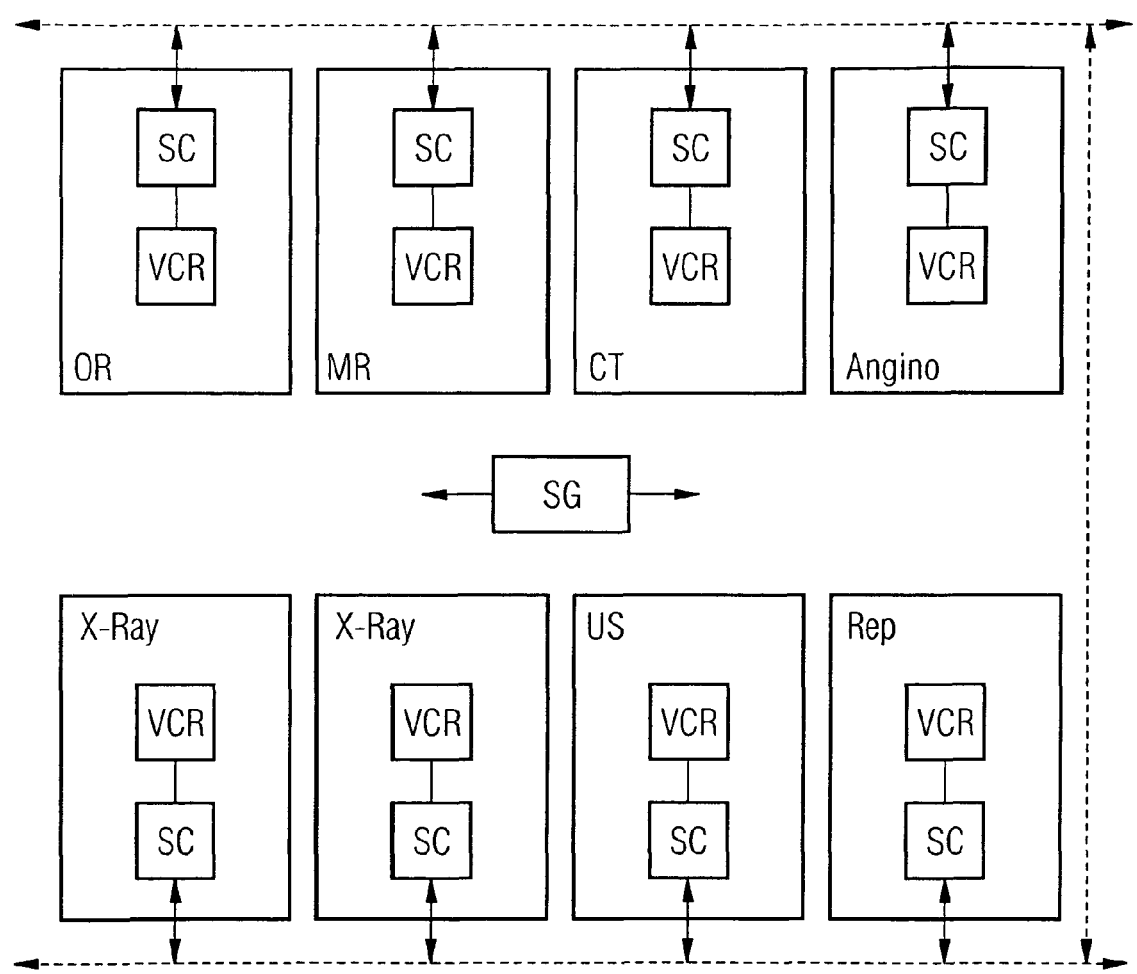
FIG. 10 illustrates one embodiment of a hospital scenario.

FIG. 10 illustrates a hospital. The hospital may include a magnetic resonance imaging department (MR) or in the ultrasound department (US) or a room for documentation and reporting (Rep), for example. In each department (room), there is a "Voice Control Receiver", such as a radio receiver for control via voice signals, and a system control unit (SC). These control units are preferably internet worked with the hospital network. Each system control unit controls a target system. In the magnetic resonance imaging department (MR) this target system will be an MRI scanner. In other departments corresponding items of medical equipment are controlled by their system control unit. If required, the lighting or air conditioning may be controlled via a gateway.

The wearer of the portable controller (SG) now roams from room (department) to room (department) and controls the respective target systems via voice commands which are picked up by his controller.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for controlling or operating a plurality of target systems via spoken commands, the method comprising:
    assigning interface information to one or more target systems of the plurality of target systems, the one or more target systems including a first target system;
    transmitting the interface information from the first target system to a speech recognition system, the first target system being controllable via the spoken commands;
    checking the first target system into the speech recognition system using the interface information, unless the interface information is stored on the speech recognition system;
    analyzing the interface information for the one or more target systems including the first target system using the speech recognition system; and
    identifying spoken commands issued for controlling or operating the first target system as a function of the interface information.

2. The method as claimed in claim 1, wherein the interface information comprises a vocabulary specific to the first target system.

3. The method as claimed in claim 1, wherein a portable controller is used for control or operation, the method further comprising picking up the spoken commands and forwarding the spoken commands to a speech recognition unit using the portable controller.

4. The method as claimed in claim 3, further comprising identifying the portable controller using a unique ID for the portable controller.

5. The method as claimed in claim 4, further comprising recognizing the portable controller that is currently controlling the first target system using the unique ID for the portable controller.

6. The method as claimed in claim 3, wherein the portable controller assumes the control or operation of the first target system based on a proximity of the portable controller to the first target system to be controlled or operated.

7. The method as claimed in claim 3, further comprising:
    determining a current position of the portable controller; and
    assigning the portable controller to a target system of the plurality of target systems to be controlled or operated by the portable controller based on the current position.

8. The method as claimed in claim 1, wherein the plurality of target systems is target processes or target devices.

9. A controller for controlling or operating a plurality of target systems via spoken commands, the controller comprising:
    a microphone that picks up one or more audible signals in the vicinity of the controller; and
    a control device that transmits the one or more audible signals to a speech recognition system that is operable to store interface information for a first target system of the plurality of target systems to be controlled via the spoken commands and is operable to recognize spoken commands issued for controlling or operating the first target system, the first target system to be controlled via the spoken commands being configured to transmit the interface information to the speech recognition system.

10. The controller as claimed in claim 9, further comprising:
   a local energy store;
   a wireless communications interface; and
   a control device that is operable to control or minimize the power consumption of functional elements of the controller.

11. The controller as claimed in claim 10, further comprising:
   an accelerometer system that is operable to influence the control device for controlling or minimizing the power consumption.

12. The controller as claimed in claim 9, wherein the plurality of target systems is target processes or target devices.

13. A system for controlling or operating a plurality of target systems via spoken commands, the system comprising:
   the plurality of target systems;
   a plurality of controllers for controlling or operating the plurality of target systems via spoken commands; and
   a speech recognition system that stores interface information that is specific to a target system or a group of target systems of the plurality of target systems that are to be controlled or operated via the spoken commands, the speech recognition system being operable to analyze the interface information to recognize spoken commands issued for controlling or operating the target system or the group of target systems,
   wherein a first controller of the plurality of controllers includes a microphone for picking up audible signals in the vicinity of the first controller and a device for transmitting the audible signals to the speech recognition system, and
   wherein the target system or the group of target systems, which are controllable via the spoken commands, are configured to transmit the interface information specific to the target system or the group of target systems to the speech recognition system.

14. The system as claimed in claim 13, wherein the plurality of target systems is target processes or target devices.

* * * * *